United States Patent
Bittlingmayer et al.

(10) Patent No.: US 7,865,707 B2
(45) Date of Patent: Jan. 4, 2011

(54) GATHERING CONFIGURATION SETTINGS FROM A SOURCE SYSTEM TO APPLY TO A TARGET SYSTEM

(75) Inventors: Sven Bittlingmayer, Mainz-Kostheim (DE); Oliver Goos, Hausbay (DE); Dieter Kraemer, Armsheim (DE); Martin Schwarz, Bruschied Rheinland-Pfalz (DE); Christopher Seiwert, Taunusstein (DE); Axel Westphal, Alsheim (DE); Jens Wissenbach, Mainz (DE)

(73) Assignee: International business Machines Corporation, Armonk, NY (US)

( * ) Notice: Subject to any disclaimer, the term of this patent is extended or adjusted under 35 U.S.C. 154(b) by 1220 days.

(21) Appl. No.: 11/378,096

(22) Filed: Mar. 16, 2006

(65) Prior Publication Data

US 2007/0220248 A1    Sep. 20, 2007

(51) Int. Cl.
*G06F 9/24* (2006.01)
(52) U.S. Cl. .......................................... 713/1; 713/100
(58) Field of Classification Search ..................... 713/1, 713/2, 100; 717/174, 176
See application file for complete search history.

(56) References Cited

U.S. PATENT DOCUMENTS

| | | | |
|---|---|---|---|
| 6,724,408 B1 | 4/2004 | Chen et al. | |
| 6,728,877 B2 * | 4/2004 | Mackin et al. | 713/100 |
| 6,735,691 B1 * | 5/2004 | Capps et al. | 713/1 |
| 6,963,908 B1 * | 11/2005 | Lynch et al. | 709/220 |
| 2002/0010808 A1 * | 1/2002 | Wiggins et al. | 709/328 |
| 2003/0028555 A1 | 2/2003 | Young et al. | |
| 2003/0115305 A1 | 6/2003 | Murray et al. | |
| 2003/0130980 A1 | 7/2003 | Bell et al. | |
| 2004/0049553 A1 * | 3/2004 | Iwamura et al. | 709/213 |
| 2004/0064487 A1 | 4/2004 | Nguyen et al. | |
| 2004/0123063 A1 | 6/2004 | Dalal et al. | |
| 2004/0128203 A1 * | 7/2004 | Pierre et al. | 705/26 |
| 2004/0158621 A1 | 8/2004 | Reyna | |
| 2004/0199609 A1 | 10/2004 | Papatla et al. | |
| 2005/0149940 A1 * | 7/2005 | Calinescu et al. | 718/104 |
| 2006/0064474 A1 * | 3/2006 | Feinleib et al. | 709/220 |
| 2006/0095700 A1 * | 5/2006 | Sato et al. | 711/165 |

* cited by examiner

*Primary Examiner*—Mark Connolly
*Assistant Examiner*—Paul B Yanchus, III
(74) *Attorney, Agent, or Firm*—David W. Victor; Konrad Raynes and Victor LLP

(57) ABSTRACT

Provided are a method, system and program for gathering configuration settings from a source system to apply to a target system. A source system is queried to determine configuration settings in the source system. A target system is queried to determine configuration settings in the target system. A user is enabled to enter configuration settings. The determined and user entered configuration settings are processed to generate commands to configure the target system to implement the configuration settings in the source system. The generated commands are executed to configure the target system.

23 Claims, 3 Drawing Sheets

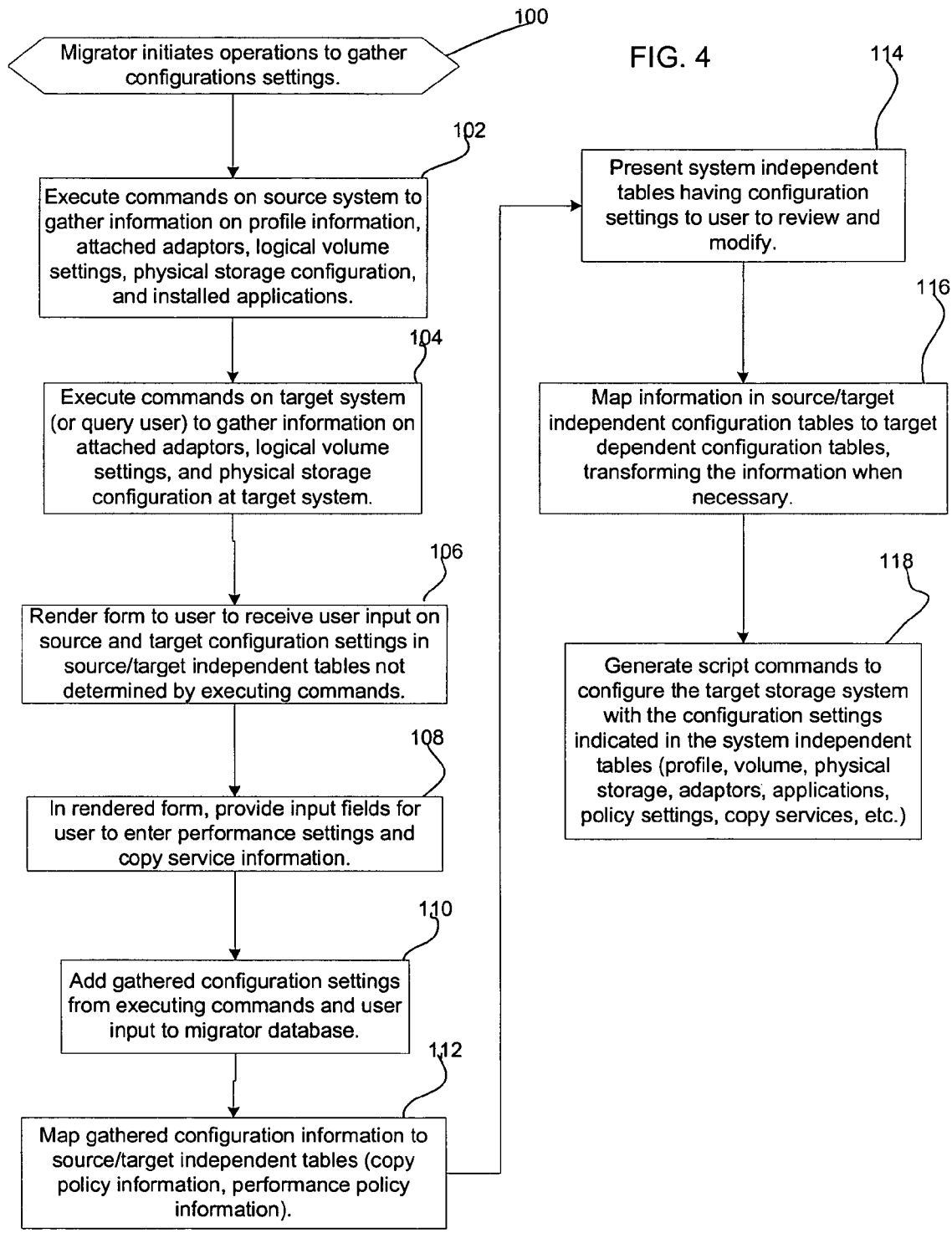

GATHERING CONFIGURATION SETTINGS FROM A SOURCE SYSTEM TO APPLY TO A TARGET SYSTEM

BACKGROUND OF THE INVENTION

1. Field of the Invention

The present invention relates to a method, system, and program for gathering configuration settings from a source system to apply to a target system.

2. Description of the Related Art

In migrating to a new computer system from a same or different vendor, the user must reconfigure the new system to include settings from the source or older system. Such settings may include the source system's view of attached storage devices, source hardware, such as adaptors, source applications, etc. This reconfiguration process may take a substantial amount of time and may discourage customers from purchasing and deploying an upgraded system.

Further, in certain environments, such as for enterprise storage servers, the configuration settings the user must configure may include numerous complex settings concerning attached storage, volumes, logical units, adaptor settings of how multiple adaptors connect to different host systems, communication settings of how the storage server communicates on the network, etc. A manual reconfiguration of an enterprise class storage server can take more than two weeks of person days. Further, the vendor may have to provide substantial customer support to assist the customer with the reconfiguration of the new system. Such customer support may be quite expensive for complex upgrades, such as for enterprise storage servers, which require assistance from highly skilled and knowledgeable customer support technicians.

For these reasons, there is a need in the art for improved techniques to migrate configuration settings from a source to a target system.

SUMMARY

Provided are a method, system and program for gathering configuration settings from a source system to apply to a target system. A source system is queried to determine configuration settings in the source system. A target system is queried to determine configuration settings in the target system. A user is enabled to enter configuration settings. The determined and user entered configuration settings are processed to generate commands to configure the target system to implement the configuration settings in the source system. The generated commands are executed to configure the target system.

BRIEF DESCRIPTION OF THE DRAWINGS

FIG. 4 illustrates an embodiment of operations performed by a migrator program to gather configuration settings from a source and target systems and applying the configuration settings to the target system.

DETAILED DESCRIPTION

Figure 1:
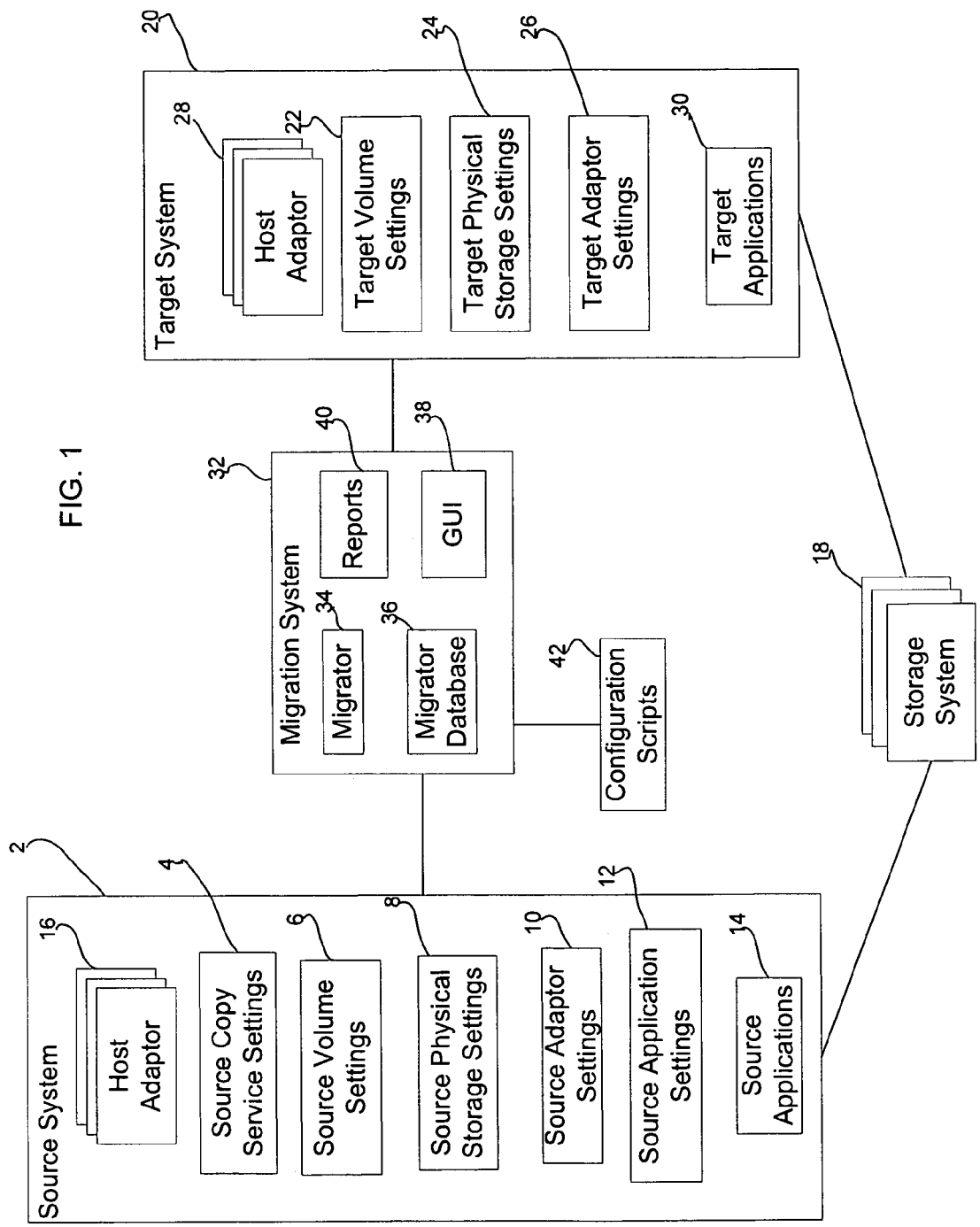
FIG. 1 illustrates an embodiment of a computing environment.
Figure 2:
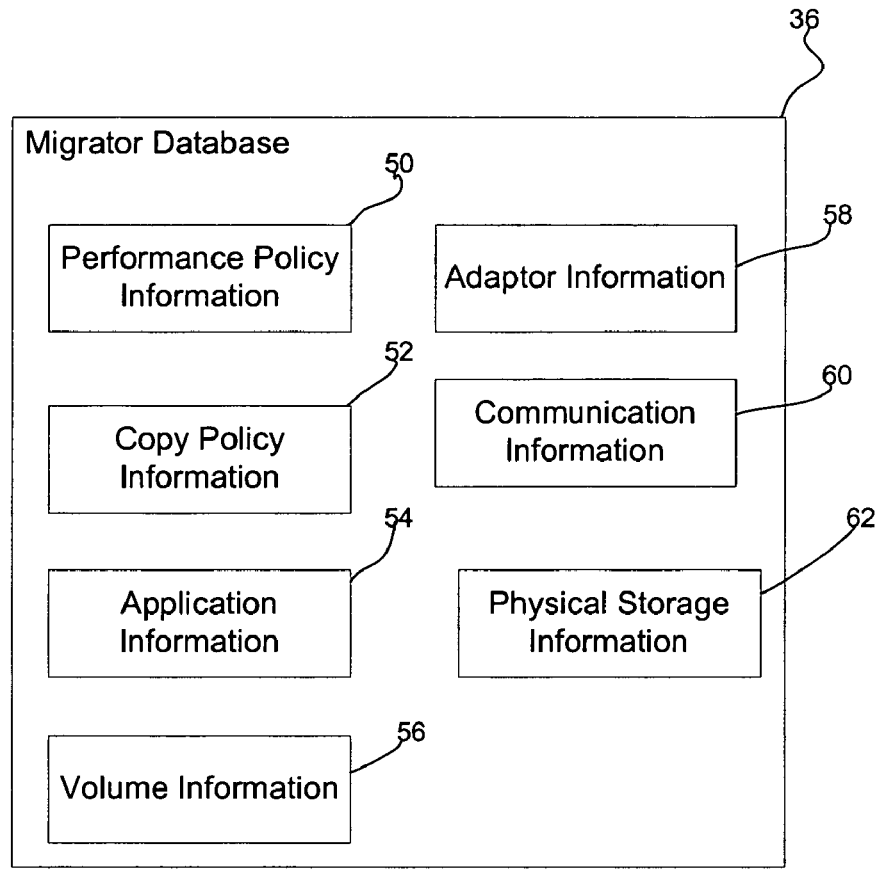
FIG. 2 illustrates an embodiment of a migrator database.

FIG. 1 illustrates an embodiment of components in a migration environment. A source system 2 comprises a system having various settings, including source copy service settings 4, source volume settings 6, source physical storage settings 8, source adaptor settings 10, and source application settings 12 for source applications 14 installed on the source system 2. The source system 2 includes host adaptors 16 to communicate with attached host systems (not shown), where the host systems access storage systems 18 through the source system 2.

The source copy service settings 4 indicate a copy service implemented in the source system 2, such as one of the applications 14, implementing a copy operation between primary and secondary designated volumes or other storage units in the storage systems 18. The copy operation may comprise synchronous copy operations, e.g., peer-to-peer, asynchronous copy operations, e.g., remote copy, etc. The source volume settings 6 indicate a logical configuration configured in the storage systems 18, including volume identifiers of logical volumes, volume size, identifiers of logical units in which the volumes are configured, applications in the source system that use the volumes, pools in which the volume is included, volume capacity, etc. The source physical storage settings 8 may indicate the physical configuration of the storage systems 18, e.g., Redundant Array of Independent Disk (RAID) rank information, disk devices assigned to the storage, etc. The source adaptor setting 10 include settings of the configuration of the host adaptors 16 at the source system 2, such as a host name that is connected to that host adaptor 16, and adaptor identifier (ID), an adaptor alias, a port group ID and port ID of ports configured in the adaptor, etc. The source application settings 12 provide application specific settings for applications 14 installed on the source system 2.

In described embodiments, the configuration settings in the source system 2 are to be migrated to a target system 20. The target system 20 includes various configuration settings including target volume settings 22 indicating volume identifiers of volumes, identifiers of logical units in which the volumes are configured, pools in which the volume is included, volume capacity, etc. The target physical storage settings 24 may indicate the physical configuration of the storage, e.g., Redundant Array of Independent Disk (RAID) rank information, disk devices assigned to the storage, etc. The target adaptor setting 26 include settings of the configuration of host adaptors 28 at the target system 20, such as a host name that is connected to that host adaptor, an adaptor identifier (ID), an adaptor alias, a port group ID and port ID of ports configured in the adaptor, etc. The target system 20 further includes target application 30.

A migration system 32 includes a migrator program 34 that manages the configuration of the target system 20 to implement the configuration settings of the source system 2. The migrator 34 gathers configuration settings 4, 6, 8, 10, and 12 from the source system 2 and configuration settings 20, 22, and 24 from the target system 18. The migrator 34 may gather the configuration settings by executing commands, such as command line interfaces, on the source 2 and target 18 systems that query data structures, databases and programs to gather the configuration settings. The migrator 34 may further communicate an electronic request for information to a user to enable the user to enter further information on the source and target configuration settings to supplement the information the migrator 34 gathers by executing programs and commands. All the gathered information is stored in a migrator database 36. The migrator 34 may generate a graphical user interface (GUI) 38 to enable a user to review, enter, and modify information on source 2 and target 20 system configuration setting information being presented to the migrator 34. Further, the migrator 34 may generate reports 38 on the configuration settings and a plan of how the migrator 34 will configure the target system 18 to implement the configuration settings 4-12 of the source system 2. The migrator 34 further generates configuration scripts 42 comprising commands and program calls to configure programs (e.g., the applications 30), hardware (e.g., the target host adaptors 28, storage adaptors, etc.), and settings in the target system 20 to implement the configuration settings in the source system 2.

The source system 2 and target system 20 may communication with the storage systems 18 via a direct connection or over a network, such as a Wide Area Network (WAN), Local Area Network (LAN), Storage Area Network (SAN), wireless network, the Internet, an Intranet, peer-to-peer network, etc. Further, the migrator system 30 may communicate with the source system 2 and target system 20 via direct connections or over a network, which may comprise the same or different network the source 2 and target 20 systems use to communicate with the storage systems 18. The storage system 18 may comprise storage devices known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a tape library, an optical library, a network attached storage (NAS), etc.

The migrator database 36 has data structures or records including performance policy information 50 comprising user defined policies that may be associated with applications 14, such as specifying a redundancy and performance of hardware resources allocated to the application, including storage 18 and adaptor 16 resources; copy policy information 52 identifying defined copy policies, such as peer-to-peer copy relationship, remote copy relationships, etc. for source and target volumes in the storage systems 18 that are subject to a copy relationship managed by the source system 2; application information 54 providing configuration settings 12 for the source applications 14 installed on the source system 2; volume information 56 comprising a logical configuration of volumes and other logical devices configured in the storage system 18 accessible to the source system 2; adaptor information 58 comprising the source 10 and target 26 adaptor configuration settings, such as the adaptor ID, host names of one or more hosts that connect to the adaptor ID, port information, etc.; communication information 60 such as the network address, e.g., IP address, of the source system 2, passwords, user identifiers, etc.; and physical storage information 62 indicating the physical configuration of the storage systems 18, such as a RAID configuration, number of disks, parameters of disks in the attached storage systems 18, etc.

In one embodiment, the user may define performance policy levels, e.g., gold, bronze, platinum, etc., where each performance policy level defines a certain amount of hardware resource, e.g., adaptor, network, storage, redundancy and performance. An application may then be provisioned hardware resources, e.g., storage, adaptors, network connectivity, etc., defined by the performance policy level.

Figure 3:
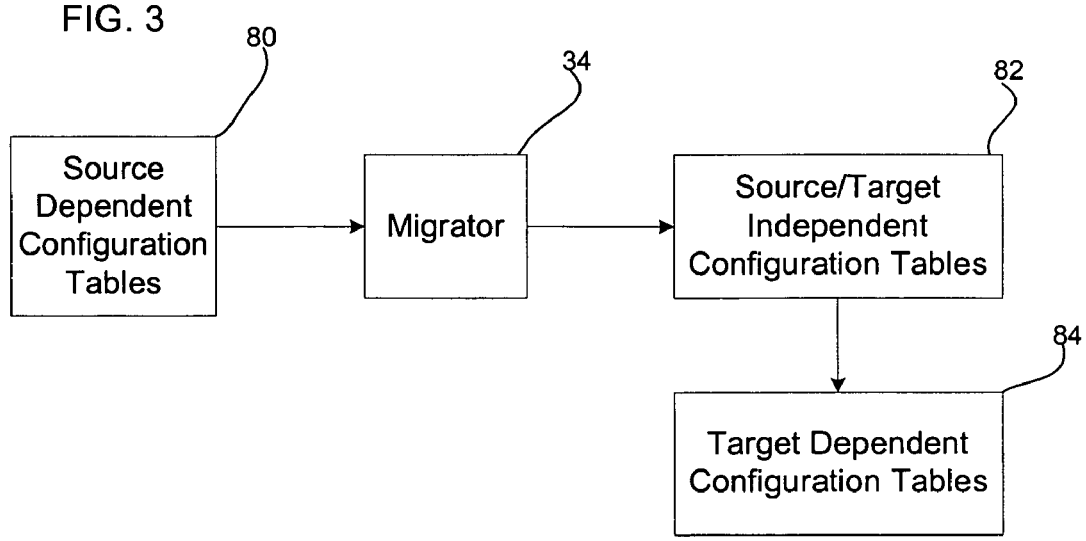
FIG. 3 illustrates an embodiment of an illustration of the process of a migrator program transferring configuration settings from a source system to a target system.

FIG. 3 illustrates an embodiment of the process for transforming source dependent configuration settings to target system dependent configuration settings. The migrator 34 obtains source dependent configuration tables 80 having information on the source configuration settings 4, 6, 8, 10, and 12 in source dependent data structures, i.e., the tables used by the operating system and applications in the source system 2. The migrator 34 transforms the configuration information in the source dependent configuration tables 80 into source independent configuration tables 82 that are not dependent on the source system 2 operating system and programs. The migrator 34 then transforms the configuration settings in the source/target independent configuration tables 82 to target dependent configuration tables 84 that may be installed on the target system 29 or used to configure the target system 20. For instance, the source 2 and target 20 systems may initialize and store configuration settings in different formats and data structures. The source 80 and target 84 dependent configuration tables would conform to the specific structure and format used by the source 2 and target 20 systems, respectively, to store configuration settings.

In one embodiment, the source 2 and target 20 systems may comprise storage servers, such as enterprise storage servers, that have different storage server operating systems. The different source 2 and target 20 systems may comprise different versions of a storage server system from a same vendor or different storage server operating systems from different vendors. The migrator 34 is coded with information to map configuration settings from the source system 2 dependent configuration tables and data structures 80 to source/target independent configuration tables 82 and then to target dependent configuration tables 84. Further, the migrator 34 is coded with information to map a format of volumes and storage in the source system 2 to the format of volumes and storage 20 recognized by the target system 20. This may involve the migrator 34 changing the size and format of source volumes to meet the requirements of the target volumes.

FIG. 4 illustrates an embodiment of operations performed by the migrator 34 to transfer source configuration settings 2, 4, 6, 8, 10, and 12 to the target system 20. Upon the migrator 34 being invoked (at block 100), the migrator 34 executes (at block 102) commands on the source system 2 to gather information on the user profile, attached adaptors 10, logical volume settings 6, physical storage configuration 8, communication information, etc. The gathered source configuration settings may be maintained in source dependent configuration tables 80. The migrator 34 further executes (at block 104) commands on the target system 20 (or queries the user) to gather information on attached adaptors 28, logical volume settings 22, and physical storage configuration 24 at the target system 20. In one embodiment, the migrator 34 may use command line interfaces (CLI) of the source system 2 and target system 20 to access their configuration settings. The migrator 34 further renders (at block 106) a form in the GUI 38 to a user to receive user input on source and target configuration settings in the source/target independent configuration tables 82 not determined by executing the commands at blocks 102 and 104. For instance, certain of the information on the source or target volume settings 6, 22, physical storage settings 8, 24, adaptor settings 10, 26, application settings 12, performance policies at the source system 2, communication information 60 for the source system 2, etc., may need to be provided by the user through the GUI 38 by entering information in a computer readable form that may be processed by the migrator 34. The rendered form includes (at block 108) input fields for a user to enter performance settings 50 and copy service information 52 on copy relationships between volumes configured in the connected storage systems 18.

The migrator 34 adds (at block 110) gathered configuration settings from executing commands and user input to the migrator database 26. The migrator 34 maps user entered configuration information maintained in the migrator database 26 to source/target independent tables 82 (copy policy information, performance policy information). The migrator 34 maps (at block 112) the gathered configuration information (from executing the commands and user input) to the source/target independent tables 82 (copy policy information, performance policy information) to supplement the information determined by executing the commands at blocks 102 and 104. The migrator 34 may further present (at block 114) the source/target independent tables 82, i.e., reports 40, having the source and target configuration settings to the user via the GUI 38 for the user to review and modify via the GUI. The migrator 34 maps (at block 116) information in source/target independent configuration tables 82 to target dependent configuration tables 84, transforming the information when necessary. For instance, the source volume settings, adaptor settings, etc. may be mapped to the data structures or configuration tables used in the target system 20 for such configuration settings. In one embodiment, the target system may maintain a different format for certain configuration settings, such as the volume settings. In such case, the migrator 34 is coded to transform source configuration settings to the format used by the target system. The migrator 34 then generates (at block 118) configuration scripts 42 having commands to configure the target storage system 20 with the configuration settings indicated in the system independent tables 82 (profile, volume, physical storage, adaptors, applications, policy settings, copy services, etc.). For instance, the configuration script 42 may set-up a copy relationship with a copy application 30 to implement the copy operations specified in the source copy service settings 4, creating target copy service settings. The configuration scripts 42 may further execute commands to update the target volume settings 22, target physical storage settings 24, target adaptor settings 26, application settings, etc. according to the target dependent configuration tables 84. The configuration scripts 42 may include command line interface (CLI) commands recognized by the target system 20 to configure the target system 20.

Described embodiments provide techniques to automatically gather information on configuration settings in a source system that will be used to configure a target system to implement the configuration settings in the source system. The migrator program may further gather information on the configuration of the target system that is to be modified with the source configuration settings. Further, the migrator 34 may query the user to provide information on configuration settings to supplement the information gathered automatically by the migrator 34. This migrator 34 accumulates all the gathered information, from executing programs in the source 2 and target 20 systems and through user input, and then uses the gathered information to generate scripts executed on the target system to configure the target system according to the gathered source system configuration.

By substantially automating the configuration procedure, the migrator program saves customers a substantial amount of time to upgrade their systems. Further, by reducing the opportunities for human error and automating a substantial part of the reconfiguration process, the system vendor substantially reduces the amount of customer support services that must be provided to customers to affect the upgrade.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In one embodiment, the migrator program may be provided by a vendor to allow customers to migrate settings from an earlier version of a system, e.g., an earlier version of an enterprise storage server, to a more recent version of the system. In this way, the vendor provides a tool that makes it easier for customers to deploy the new system and reduces the amount of time customers must spend to reconfigure the new system.

The migrator program is described as being used to copy configuration settings between different storage server systems. In additional embodiments, the migrator program may be used to transfer configuration settings from different types of source systems to different types of target systems, such as workstations, desktop computers, mainframes, hand held computing devices, telephony devices, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture implementing code, wherein the code is executed to communicate with a database, source system and target system and cause operations to be performed, the operations comprising:

querying a source system to determine configuration settings in the source system;

querying a target system to determine configuration settings in the target system;

providing a user interface to enable a user to enter configuration settings for the source system and target system to supplement the source system and target system configuration settings determined by querying the source system and the target system, wherein the configuration settings for the source and target configuration settings provided by the user via the user interface were not determined by performing the querying of the source system and the target system;

combining the determined configuration settings from the source and target systems and the user entered configuration settings for the source and the target systems into a data structure in the database;

accessing and processing the determined and user entered configuration settings for the source and target systems in the data structure to generate commands to configure the target system to implement the configuration settings in the data structure for the source system and the target system; and executing the generated commands to configure the target system.

2. The article of manufacture of claim 1, wherein the determined configuration settings from the source and target systems include a logical and physical configuration of storage systems accessible to the source system, and wherein processing the determined configuration settings comprises determining a configuration of the target system storage to implement the logical and physical configuration of the source system storage, and wherein the generated commands include commands to configure the target system to implement the logical configuration of the source system storage.

3. The article of manufacture of claim 1, wherein the determined and user entered configuration settings include information on host adaptors at the source system, including identifiers and assignments of the host adaptors, wherein the generated commands include commands to configure the target system host adaptors to use the identifiers and have the assignments of the host adaptors in the source system as indicated in the configuration settings.

4. The article of manufacture of claim 1, wherein the determined and user entered configuration settings include information on applications installed at the source system to install in the target system, and wherein the generated commands include commands to configure the applications on the target system with the determined and user entered configuration settings for the applications as installed on the source system.

5. The article of manufacture of claim 1, further comprising:

processing the determined configuration settings for the source system to access the configuration settings for the source system and store the configuration settings in a system independent data structure; and converting the system independent data structure including the configuration settings of the source system into a target system dependent data structure, wherein generating the commands comprises generating commands to apply the configuration settings in the target system dependent data structure to the target system.

6. The article of manufacture of claim 1, further comprising:

determining a copy service policy implemented at the source system specifying to copy data from source storage locations to target storage locations; and generating commands to implement the determined copy service policy at the target system to copy the data at the source storage locations to the target storage locations.

7. The article of manufacture of claim 6, wherein the copy service policy is determined from user input through the form indicating a type of the copy operation and source and target storage locations used for the copy operation.

8. The article of manufacture of claim 1, wherein enabling the user to enter configuration settings comprises enabling the user to define performance policy levels, where each policy level defines an amount and quality of hardware resources to allocate, wherein the application assigned one performance policy level is provisioned the hardware resources specified by the assigned policy level.

9. The article of manufacture of claim 8, wherein the performance policy levels specify an amount of redundancy and performance of storage and network related resources provisioned to an application assigned the policy level.

10. A system in communication with a database, a source system and a target system, wherein the system is accessible to a user, comprising:

a processor;

a computer readable medium including code executed by the processor to perform operations, the operations comprising:

querying the source system to determine configuration settings in the source system;

querying the target system to determine configuration settings in the target system;

providing a user interface to enable the user to enter configuration settings for the source system and target system to supplement the source system and target system configuration settings determined by querying the source system and the target system, wherein the configuration settings for the source and target configuration settings provided by the user via the user interface were not determined by performing the querying of the source system and the target system;

combining the determined configuration settings from the source and target systems and the user entered configuration settings for the source and the target systems into a data structure in the database;

accessing and processing the determined and user entered configuration settings for the source and target systems in the data structure to generate commands to configure the target system to implement the configuration settings in the data structure for the source system and the target system; and executing the generated commands to configure the target system.

11. The system of claim 10, wherein the determined configuration settings from the source and target systems include a logical and physical configuration of storage systems accessible to the source system, and wherein processing the determined configuration settings comprises determining a configuration of the target system storage to implement the logical and physical configuration of the source system storage, and wherein the generated commands include commands to configure the target system to implement the logical configuration of the source system storage.

12. The system of claim 10, wherein the determined and user entered configuration settings include information on host adaptors at the source system, including identifiers and assignments of the host adaptors, wherein the generated commands include commands to configure the target system host adaptors to use the identifiers and have the assignments of the host adaptors in the source system as indicated in the configuration settings.

13. The system of claim 10, wherein the operations further comprise:

processing the determined configuration settings for the source system to access the configuration settings for the source system and store the configuration settings in a system independent data structure; and converting the system independent data structure including the configuration settings of the source system into a target system dependent data structure, wherein generating the commands comprises generating commands to apply the configuration settings in the target system dependent data structure to the target system.

14. The system of claim 10, wherein the operations further comprise:

determining a copy service policy available at the source system specifying to copy data from source storage locations to target storage locations; and generating commands to implement the determined copy services at the target system to copy the data at the source storage locations to the target storage locations.

15. The system of claim 10, wherein enabling the user to enter configuration settings comprises enabling the user to define performance policy levels, where each policy level defines an amount and quality of hardware resources to allocate, wherein an application assigned one performance policy level is provisioned the hardware resources specified by the assigned policy level.

16. The system of claim 15, wherein the performance policy levels specify an amount of redundancy and performance of storage and network related resources provisioned to the application assigned the policy level.

17. A method, comprising:

querying a source system to determine configuration settings in a source system;

querying a target system to determine configuration settings in a target system;

providing a user interface to enable a user to enter configuration settings for the source system and target system to supplement the source system and target system configuration settings determined by querying the source system and the target system, wherein the configuration settings for the source and target configuration settings provided by the user via the user interface were not determined by performing the querying of the source system and the target system;

combining the determined configuration settings from the source and target systems and the user entered configuration settings for the source and the target systems into a data structure in a database;

accessing and processing the determined and user entered configuration settings for the source and target systems in the data structure to generate commands to configure the target system to implement the configuration settings in the data structure for the source system and the target system; and executing the generated commands to configure the target system.

18. The method of claim 17, wherein the determined configuration settings from the source and target systems include a logical and physical configuration of storage systems accessible to the source system, and wherein processing the determined configuration settings comprises determining a configuration of the target system storage to implement the logical and physical configuration of the source system storage, and wherein the generated commands include commands to configure the target system to implement the logical configuration of the source system storage.

19. The method of claim 17, wherein the determined and user entered configuration settings include information on host adaptors at the source system, including identifiers and assignments of the host adaptors, wherein the generated commands include commands to configure the target system host adaptors to use the identifiers and have the assignments of the host adaptors in the source system as indicated in the configuration settings.

20. The method of claim 17, further comprising:
processing the determined configuration settings for the source system to access the configuration settings for the source system and store the configuration settings in a system independent data structure; and
converting the system independent data structure including the configuration settings of the source system into a target system dependent data structure, wherein generating the commands comprises generating commands to apply the configuration settings in the target system dependent data structure to the target system.

21. The method of claim 17, further comprising:
determining a copy service policy implemented at the source system specifying to copy data from source storage locations to target storage locations; and
generating commands to implement the determined copy services at the target system to copy the data at the source storage locations to the target storage locations.

22. The method of claim 17, wherein enabling the user to enter configuration settings comprises enabling the user to define performance policy levels, where each policy level defines an amount and quality of hardware resources to allocate, wherein an application assigned one performance policy level is provisioned the hardware resources specified by the assigned policy level.

23. The method of claim 22, wherein the performance policy levels specify an amount of redundancy and performance of storage and network related resources provisioned to an application assigned the policy level.

* * * * *